Sept. 13, 1949. M. F. KNOY 2,481,520
COOLING CYCLE FOR INTERNAL-COMBUSTION ENGINES
Filed Feb. 7, 1944 2 Sheets-Sheet 2

INVENTOR
MARION F. KNOY
BY
HARRIS, KIECH, FOSTER & HARRIS
FOR THE FIRM
ATTORNEYS

Patented Sept. 13, 1949

2,481,520

UNITED STATES PATENT OFFICE 2,481,520

COOLING CYCLE FOR INTERNAL-
COMBUSTION ENGINES

Marion F. Knoy, Long Beach, Calif., assignor to
Robert T. Collier, Wilmington, Calif.

Application February 7, 1944, Serial No. 521,354

20 Claims. (Cl. 62—119.5)

This invention relates to cooling or refrigeration broadly, and more particularly to sealed circulating systems for cooling internal combustion engines or other types of heat generating engines including turbines.

A principal object is to maintain regulated cooling in accordance with temperatures generated in the engine. This object is accomplished by employing the so-called gas absorption cycle and utilizing it in connection with the liquid cooling jacket of internal combustion engines.

Another object of the invention is to improve the gas absorption cycle itself without particular regard to the present internal combustion engine cooling.

While it is recognized that the gas absorption cycle has been employed generally for refrigeration purposes, it has not heretofore been employed in the cooling of internal combustion engines and the like through the medium of the cooling-liquid jacket employed in such engines.

Therefore, stated briefly, one phase of the invention resides in employing the heat generated in an internal combustion engine by passing rich absorption liquid of the gas-absorption refrigeration type through the cooling-liquid jacket of the engine, whereby the heat of the engine serves to liberate the dissolved refrigerant gas contained in the absorption liquid, thereby to operate the gas absorption refrigeration cycle. By thus evaporating the refrigerant gas from the absorption liquid, the engine is correspondingly cooled.

For a better understanding of the various phases of this invention, it may be stated that the conventional gas absorption cycle comprises a heated so-called generator to which is fed a "rich" absorption liquid (commonly water which has been enriched by absorbing therein an operative amount of a refrigerant gas, commonly ammonia), the refrigerant gas and a small proportion of water vapor being expelled from the liquid by the application of heat to the generator; an accumulator or separator into which the hot liquid and gas are conveyed and in which the gas separates from the liquid; a so-called analyzer into which the separated gas and usually some water vapor enter and in which they pass through fresh rich absorption liquid passing to the generator; a rectifier through which the gas passes to remove any water vapor remaining; an elevated condenser to receive and liquefy the refrigerant; an elevated evaporator into which the liquefied refrigerant flows and into which an uncondensable carrier gas, such as hydrogen, enters, and wherein the refrigerant evaporates in the presence of the carrier gas to produce the cooling effect; and an absorber into a lower portion of which the descending column of spent refrigerant gas and carrier gas passes to rise countercurrently against descending weak or "lean" absorption liquid (i. e., liquid largely denuded of the refrigerant gas) flowing by gravity from the accumulator into the top of the absorber, whereby the liquid absorbs the refrigerant gas (with heat evolution) and returns by gravity to the analyzer and thence to the generator, the hydrogen leaving the top of the absorber and returning to the evaporator circuit.

In employing a gas absorption cycle for the cooling of internal combustion engines, I propose to use the cooling jacket of the engine as a generator and a gas absorption liquid as the cooling liquid. Thus, boiling of the refrigerant from the absorption liquid in the cooling jacket accomplishes cooling of the engine, without regard to whether or not the evaporator of the cycle is used to produce refrigeration at a desired point or otherwise.

The gas absorption refrigerating cycle employed for the present purpose of cooling heat generating engines may be conventional. However, the preferred form of cooling system here used also contains novel features, which include a gas lift, or vapor lift, for elevating the rich absorption liquid to establish a head which is higher than that in the absorber whereby to augment the feed of the rich absorption liquid to the cooling jacket of the engine to be cooled. Another feature of the invention is that, under heavier heat loads developed by the engine, the elevated head of rich absorption liquid will be increased by automatic transfer or shift of a greater proportion of the main body of rich absorption liquid from the absorber, than under light heat loads, thereby insuring circulation of still greater amounts of rich absorption liquid and liberation of more refrigerant vapors to meet effectively the higher heat loads. This feature of the invention includes employing apertures or perforations in an upper portion of a standpipe in the gas lift device, whereby liquid may flow from the standpipe through the apertures under light loads, and over the top of the standpipe under heavy load conditions. A further feature of this aspect of the invention resides in providing for the accumulation of excess liquefied refrigerant gas not required to produce cooling in the evaporator or refrigerator of the cycle, whereby this excess liquid refrigerant, e. g., liquefied ammonia, may be directly returned to the rich absorption liquid and then passed to the cooling liquid jacket of the engine to speed up the rate of engine cooling by increasing the rate of vaporization of the refrigerant. Thus, excess quantities of refrigerant may pass through the heat absorbing, engine cooling portion of the cycle and through the gas lift portion of the cycle without performing any refrigeration in the evaporator, only that portion of the liquid refrigerent being passed to the evaporator which is necessary for the refrigeration required, a thermostatically regulated valve being employed for the purposes of the control.

The invention additionally includes the provision of an absorber having a number of individual jets for supplying lean absorption liquid to individual finned coils or tubes through which the spent gases and vapors rise in the absorber countercurrent to the flow of the lean absorption liquid, thereby providing a back pressure on the liquid and insuring equal distribution of the liquid to all coils. Another feature of novelty is found in the use of a helical fin having a metal bond to the internal pipe of a heat exchanger between the absorber and the engine for heat exchange between the cold rich absorption liquid and the hot lean absorption liquid returning to the absorber. Another feature of the invention resides in providing a by-pass around the condenser so that the hot gases and vapors separated from the hot liquid leaving the engine will pass directly into the evaporator, thereby converting the evaporator into a heater upon cutting the condenser out of the circuit. Thus, the evaporator may be placed in the body of an automobile or in the cab of a truck, or at any other desired point of use, and employed for either cooling or heating, as desired.

Other features of the present invention relate to the absorption liquid, the refrigerant, and the carrier gas. Preferably, a carrier gas is employed other than hydrogen, which carrier gas will not seep through iron or steel as does hydrogen. Helium is preferred as such a carrier gas because its molecule is sufficiently large to prevent loss by seepage through iron and steel parts, thereby making it possible to use iron and steel in the system. Moreover, helium is light enough so that it can be employed with ammonia gas as the refrigerant and readily separated therefrom in the system, the molecular weight of helium being 4 and that of ammonia being 17.

A further feature of the invention resides in employing a suitable solute, such as glycerol, or a monohydric alcohol such as methanol, or a water-soluble salt such as calcium chloride, to reduce vapor tension of the water and lower the partial pressure, whereby to increase efficiency further.

Another aspect of the invention is found in employing three or more liquids having different boiling points, two or more of these liquids acting as refrigerants, so that, when elevated temperatures, such as are encountered in an internal combustion engine under heavy load, cause one refrigerant to be largely boiled out of the absorption liquid, the liquid of next higher boiling point comes into play. The last-mentioned liquid may also be a vapor-tension reducing agent, as above indicated. For example, in addition to water as the high boiling point liquid, acetone or methyl alcohol may be employed as the liquid of intermediate boiling point, ammonia or the like being the primary refrigerant, and hydrogen, or preferably helium, being the carrier gas.

In the accompanying drawings wherein certain embodiments of the invention are disclosed by way of illustration, Fig. 1 is a diagrammatic elevation with parts broken away, showing how the system of the present invention may be applied to the cooling of an internal combustion engine of an automobile or the like;

Figure 1:
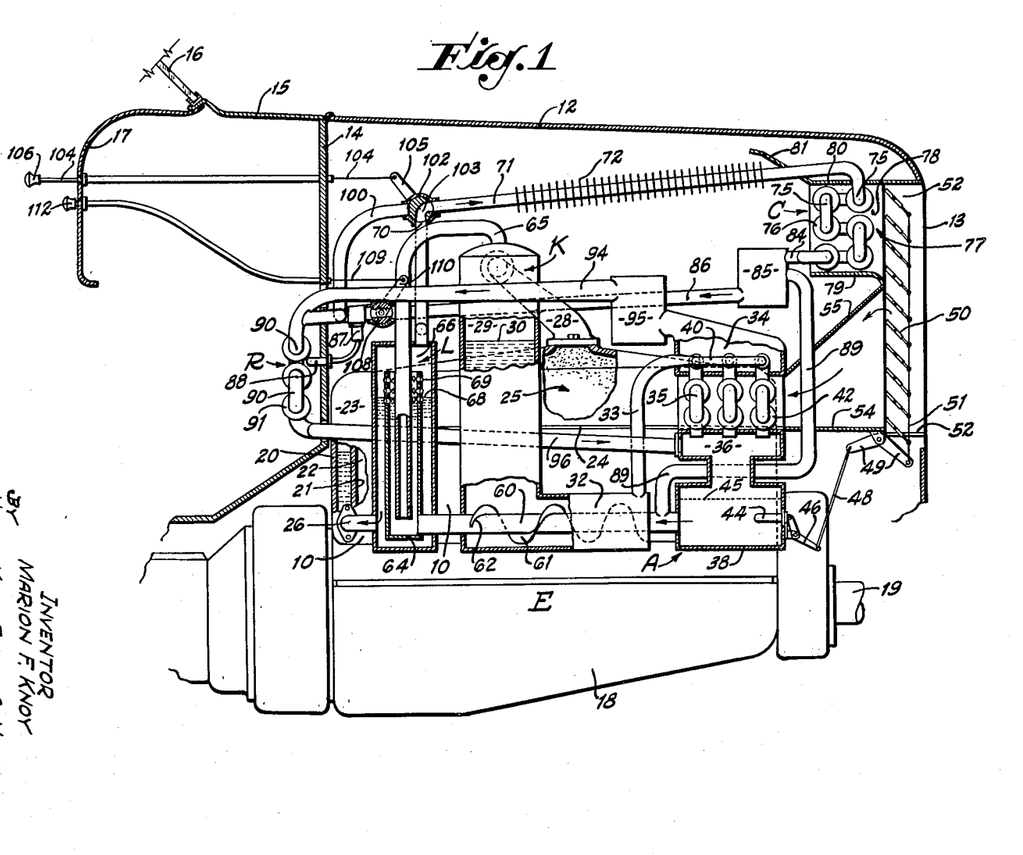
Figures 2, 3:
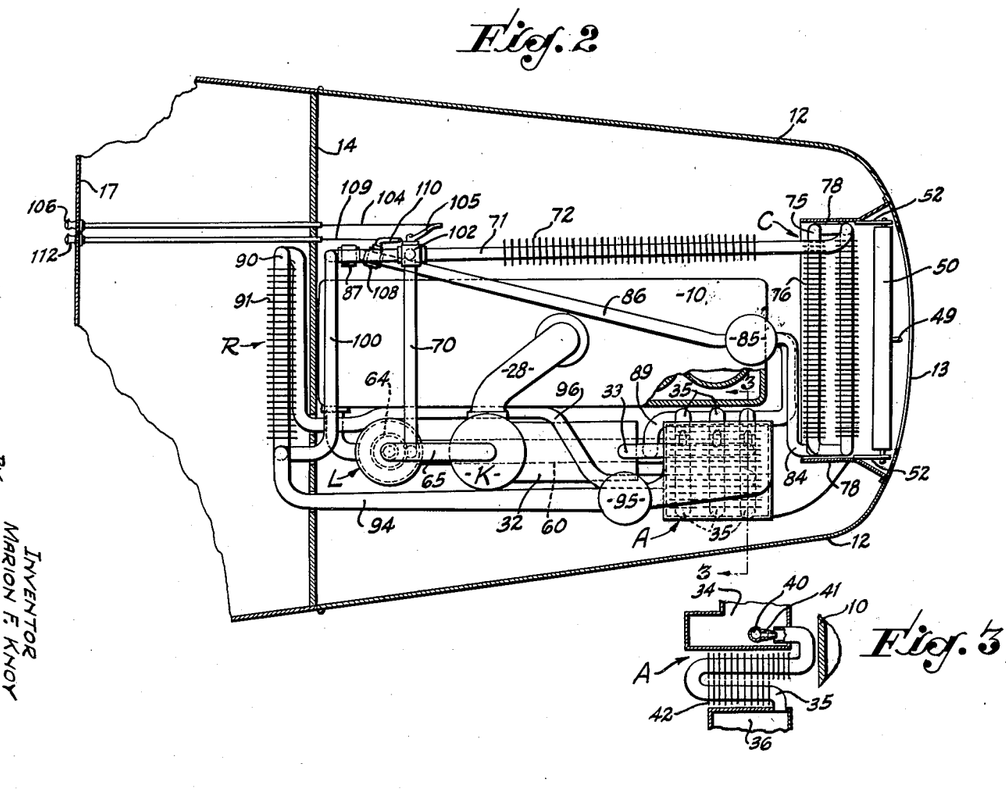
Fig. 2 is a plan view of the arrangement shown in Fig. 1, portions being broken away.
Fig. 3 is a sectional detail taken on the line 3—3 of Fig. 2.

Referring more particularly to Fig. 1 of the drawings, the principal parts of the apparatus illustrated are: a conventional internal combustion engine E having an engine block 10; an accumulator and separator K which receives hot lean absorption liquid from the engine block 10 and in which the liberated refrigerant gases separate; a liquid collector L into which the separated gases are passed to produce a gas lift effect for establishing an elevated head of rich absorption liquid to feed the engine block; a condenser C in which the gases are condensed to form liquefied refrigerant; an evaporator or refrigerator R in which the liquefied refrigerant produces a cooling or refrigerating effect; and an absorber A in which refrigerant gases are reabsorbed in the lean absorption liquid.

The engine E and associated equipment just described are shown as positioned under a conventional automobile hood 12, at the forward end of which is a grill 13, and at the other end of which are conventionally located a dashboard 14, a cowl 15, a windshield 16, and an instrument panel 17. In addition to the engine block 10, the engine E is shown as having the usual crank case 18 and crankshaft 19. The engine block 10 is provided with a series of conventional vertically disposed liquid passages 20 which constitute a cooling liquid jacket surrounding the conventional cylinder bores 21 in which reciprocate pistons 22 connected in any suitable manner to drive the crankshaft 19. A cylinder head 23, which may be of conventional construction employed on internal combustion engines, is secured to the engine block 10 in any suitable manner and is sealed thereon by means of a conventional gasket 24.

The cylinder head 23 is provided with a liquid chamber 25 which communicates in a conventional manner with the vertical liquid passages 20 for the purpose of receiving rising liquid and gases therefrom.

A suitable cooling liquid, such as is described herein, is supplied to the passages 20 in the engine block 10 as by means of a short connecting pipe 26 which communicates with one lower corner of the engine block as illustrated. When the engine 10 is in operation, it acts as a heat generator which vaporizes the refrigerant constituent of the liquid, for example, ammonia, whereby the engine block 10 is cooled by reason of the heat absorption accomplished by the vaporizing step. The resultant hot liquid and liberated gases rise through the passages 20 in the engine block 10 and into the chamber 25 in the head 23, from the top of which they pass by way of a riser or neck 28 into the top of the accumulator and separator K, in which the hot gases separate from the liquid, some of the water vapor condenses, and the liquid descends to leave a gas space 29 thereabove and to establish a liquid level approximately as indicated at 30.

The lean liquid in the accumulator K, largely denuded of gaseous refrigerant, descends into a horizontal heat exchanger 32, through which it travels to the right as seen in Fig. 1, and thence rises through a conduit 33 from which it is injected into a header 34 at the top of the absorber A.

The absorber A includes, in addition to the header 34, a series of hairpin coils 35, whose loops extend transversely, each coil being vertically disposed and descending step by step from the header 34 to a gas receiving chamber 36 located above and connected with a liquid receiver 38 which constitutes a storage receptacle for enriched absorption liquids. In supplying lean liquid to the absorber A, the upper end of the conduit 33 is horizontally disposed so as to serve as a manifold 40, which is provided on one side with a series of nozzles or tips 41 which are directed into the adjacent open ends of the coils 35. In this manner the lean liquid builds up a back pressure under which it is jetted through the nozzles 41 into streams of ammonia gas and hydrogen, or ammonia gas and helium, being fed into the chamber 36 after leaving the evporator or refrigerator R, as presently to be described. By jetting the lean absorption liquid from the nozzles 41 into a series of streams of refrigerant and carrier gas, a high degree of contact between the rising gases and the jetted lean liquid is produced so that good absorption of the refrigerant in the liquid is obtained, thereby yielding a rich absorption liquid containing substantially all of the refrigerant in solution. A particular advantage of the method of employing each absorber coil individually with weak absorption liquid is that it insures a more even distribution of the liquid among the various coils than could be secured by gravity flow alone. In a vehicle traversing uneven roads, first one end and then the other end of the liquid supply manifold would be higher, with the result that most of the lean liquid would tend to run down in the first coil encountered, thus gorging some coils and starving others under varying conditions.

Since absorption of the refrigerant gas by the lean absorption liquid presents an exothermic phenomenon, it is desirable to provide for good cooling. For this reason each of the coils 35 is well provided with fins 42 which assist in carrying heat from the gases and liquids in the coils to the air streams which are directed over the coils 35 in a controlled manner. As shown, flow of air over the coils 35 is automatically regulated by means of a thermostat 44 placed in the body of rich absorption liquid in the receiver 38. Preferably the thermostat 44 is located in the upper portion of the liquid body, somewhat below the average liquid level indicated at 45, rather than in the lower portion thereof, in order that the thermostat 44 may be responsive to the most recently produced rich liquid. In the device illustrated, the thermostat 44 actuates a bell-crank 46 which controls a link 48, which in turn actuates a second bell-crank 49 that controls a series of louvers 50 through the medium of a louver-operating rod 51 connected to the bell-crank 49. The louvers 50 are pivoted in a louver housing 52 behind the grill 13 and serve to regulate the air stream passing through the grill 13 and through the condenser C (as hereinafter to be described) and over the absorber coils 35. The air currents passing through the lower louvers 50 and over the coils 35 are directed by means of a lower baffle 54 and an upper inclined baffle 55, so that the air streams move with considerable velocity over the fins 42 and corresponding coils 35 to produce sufficient cooling.

The body of rich absorption liquid normally accumulated in the receiver 38 of the absorber A would stand, for example, at the level 45. This rich liquid passes from the receiver 38 through a line 60 which is disposed in heat exchanging relation with warm lean absorption liquid in the heat exchanger section 32, whereby the rich absorption liquid is correspondingly warmed. This heat exchange effect may be enhanced by the provision of a helical fin 61 secured on the wall of the line 60 by suitable metal bonding, such as welding or soldering, as indicated at 62, the helix creating turbulence and the metal bond insuring good heat conduction. The line 60 leads the warm rich absorption liquid from the heat exchanger 32 into the lower end of a standpipe 64 centrally located in the liquid collector L and constituting a portion of a gas lift device to raise rich absorption liquid above the normal level 45 in the receiver 38 of the absorber A and thereby establish a higher liquid level and consequent hydrostatic head in the collector L.

In order to produce the gas lift effect and maintain the higher liquid level, a gas and vapor conducting pipe 65 leads from the top of the accumulator K through the top of the collector L and down into the standpipe 64, where it discharges into the liquid body at a point below the liquid level 45 in the receiver 38.

The diameter of the depending pipe 65 compared with the diameter of the standpipe 64 is such that the quantity of gases being expelled by the gas pressure in the accumulator K from the lower end of the pipe 65 is sufficient to produce a gas lift effect in the standpipe 64 which thereby becomes a gas lift chamber whereby to elevate liquid into the upper end of the standpipe 64, whence it passes into an outer chamber 66 of the collector L and tends to establish therein a liquid level approximately as indicated by the numeral 68, whereby a head of warm rich absorption liquid is created in the collector L to supply liquid to the engine block 10 under the resultant hydrostatic pressure. Thereby rich absorption liquid containing refrigerant gas in solution is continuously supplied to the passages 20 in the engine block 10 in response to heat developed therein.

As shown in Fig. 1, the upper end of the standpipe 64 is provided with perforations 69, the purpose of which is to permit liquid which is elevated in the standpipe 64 by gas lift during operation of the engine under light load to flow out through the perforations to establish the liquid level 68. However, when the engine is functioning under a heavy load so that a large quantity of liquid is being circulated in the system and a large quantity of hot gases is being liberated in the engine block 10, the gas lift in the collector L increases and the volume of warm rich liquid coming into the standpipe 64 from the receiver 38 through the heat exchanger 32 by way of the line 60 increases to a point at which all of it cannot escape through the perforations 69 and the remainder overflows from the top of the standpipe into the collector L under the increased volume effect and thereby supplies an increased quantity of liquid to the collector L and to the engine block 10 to satisfy the requirement of the greater heat production in the engine block 10 under the conditions of the heavy load.

Thus, the present system establishes two liquid levels 68 and 30 in the collector L and accumulator K successively higher than the level 45 in the receiver 38 by reason of the gas lift effect in the standpipe 64 and by reason of the gas lift effect in the riser 28 leading to the chamber 29 of the accumulator K. The gas lift effect in the standpipe 64 has the further function of supplying additional preheat to the incoming rich absorption liquid by reason of the hot gases and vapors passing through the pipe 65 from the accumulator K. This contact of the hot gases and vapors with the relatively cool rich absorption liquid in the standpipe 64 serves also to condense out some of the water vapor that may be carried over with the gas from the accumulator K.

The refrigerant gases and vapors which accumulate in the top of the collector L rise therefrom through a line 70, whence normally they pass to an inclined line 71 and thence to the condenser C. The line 71 carries cooling fins 72 which assist in lowering the temperature of the gases in the line 71 so that any small amount of water vapor that may be carried over with the gas from the collector L will be condensed, the incline of the line 71 returning such condensed water back by the line 70 into the collector L, and thereby acting to that extent as a rectifier for the gases to remove final traces of water vapor therefrom before they pass into the condenser C.

The condenser C is located forward under the hood 12 of the automobile preferably approximately in the same position that the upper portion of a conventional automobile radiator occupies, the form of condenser which is shown being a series of hairpin coils 75 provided with cooling fins 76, the coils 75 extending back and forth across the space under the hood 12 behind the louvers 50, in which position the coils 75 are cooled by air entering between the uppermost louvers. To facilitate condensation of the refrigerant gases in condenser C, the condenser coils 75 are located in an air duct 77 formed by end walls 78 and lower and upper walls 79 and 80, respectively. The end walls 78 are shown as having their forward edges secured at the sides of the grill 13 and as supporting the louver housing 52. A baffle 81 at the rear edge of the upper wall 80 extends upward toward the hood 12 for the purpose of directing a portion of the air current over the cooling fins 72 on the vapor line 71.

Under the pressure and temperature conditions of the system, refrigerant gas, commonly ammonia gas, passing through the coils 75 of the condenser C is condensed into liquid which flows from the lowermost coil 75 through a conduit 84 into a liquid refrigerant accumulating vessel 85, from which the liquefied refrigerant flows through a conduit 86 to the evaporator R. The amount of refrigerant flowing through the conduit 86 is regulated by a valve 87 controlled by a thermostat 88 mounted on the dashboard 14 adjacent evaporator R. Excess liquefied refrigerant accumulating in the vessel 85 overflows therefrom through a conduit 89 and passes to the rich gas absorption liquid line 60. The liquefied refrigerant passed by the valve 87 flows into the uppermost coil of a series of coils 90 which constitute the evaporator or refrigerator R disposed behind the dashboard 14 in the driver's compartment of the automobile. The evaporation of the liquefied refrigerant in the coils 90 produces refrigeration in the coils with consequent cooling of the compartment. To render the cooling effect more efficient, the coils 90, which are shown as hairpin coils, may be provided with fins 91 to hasten heat exchange. Evaporation of the liquefied ammonia or other refrigerant introduced into the uppermost coil 90 from the conduit 86 is accomplished by the introduction of a hydrogen (or helium) gas stream into the uppermost coil 90 from a hydrogen line 94 which conducts hydrogen gas from the header 34 at the top of the absorber A by way of a hydrogen storage vessel 95. When the hydrogen stream from the line 94 passes into contact with the liquid refrigerant in the uppermost coil 90, the liquid refrigerant evaporates by reason of the consequent partial pressure condition established in this portion of the system. The result is refrigeration. From the lowermost coil 90, a mixture of cold ammonia gas and hydrogen returns by a line 96 to the gas receiving chamber 36 in the intermediate portion of the absorber A, whence the cold ammonia gas or other cold refrigerant gas and hydrogen rise through the coils 35 in countercurrent contact with the lean absorption liquid entering the coils 35 from the manifold 40 and nozzles 41. In this mannner, the refrigerant gas is reabsorbed to produce fresh rich absorption liquid for repetition of the cycle, the hydrogen being separated from the refrigerant and returned to the refrigeration zone. With this mannner of employing a sealed repeating cycle, no new refrigerating material is required at any time in the absence of leaks in the system. It will be noted that the header 34, the hydrogen storage vessel 95, and the hydrogen line 94 are shown of relatively large cross-sectional areas with respect to the conduits for handling other gases and vapors, the purpose of these greater cross-sectional areas being to reduce the frictional contact of the hydrogen in its passage back to the refrigeration zone in the uppermost coil 90, whereby to produce relatively rapid hydrogen flow and to establish a draught or "wind" to insure good evaporation of the liquefied refrigerant and correspondingly good refrigeration in the coils 90.

In accordance with another aspect of this invention, the coils 90 of the evaporator R may be employed as heating coils by employing means adapted to by-pass the condenser C and cut it out of the system. In the form shown in the drawings, a by-pass conduit 100 is adapted to be connected with the uppper end of the vertical gas and vapor line 70 by means of a two-way rotary valve 102, the valve body having an L-shaped passage 103 adapted to connect the line 70 with the line 71, as shown in Fig. 1, when the coils 90 are used for refrigeration purposes, and adapted to be rotated about ninety degrees from the position shown so as to connect the vapor line 70 with the by-pass conduit 100 whereby hot gases and vapors rising through the line 70 from the collector L will enter by the by-pass conduit 100. The other end of the conduit 100 leads into the end of the liquefied refrigerant conduit 86 at a point adjacent the connection of the latter with the uppermost coil 90 of the evaporator R. The body of the valve 102 is adapted to be rotated from the refrigerating position shown to the heating position just described by manipulation of a push rod 104 connected at one end with an operating arm 105 secured to the valve body, and having its other end mounted in the instrument panel 17 and provided with an operating knob 106 convenient to the driver. At the same time that the valve 102 is rotated to convert the coils 90 into heating coils, it may be desirable to close the liquefied refrigerant conduit 86, and this may be accomplished by means of a rotary valve 108 located between the condenser C and the inlet of the conduit 100 into the conduit 86. When the coils 90 are employed as refrigerating coils, the valve 108 is open, but when the coils 90 are to be used as heating coils the valve 108 is closed as through the medium of a push cable 109 connected at one end to an operating lever 110 secured to the body of the valve 108 and having its other end mounted in the instrument panel 17 and provided with an operating knob 112 convenient to the driver.

In operating the coils 90 of the evaporator R as heating coils, the valves 102 and 108 are moved from the position shown in Fig. 1 so as to close the valve 108 and to rotate the valve 102 through a quarter turn in order to connect the hot gas and vapor line 70 with the by-pass conduit 100 and thereby lead hot gases and vapors directly to the coils 90, which thereby act as condenser coils and transmit their heat to warm the air in the driver's compartment.

During periods when the coils 90 operate as heating coils, the carrier gas, such as hydrogen or helium, tends to accumulate in the storage vessel 95 and the header 34 and line 94 connected therewith. Refrigerant and water which are condensed in the coils 90 leave the lowermost coil and flow by gravity through the return line 96 into the gas receiving chamber 36 of the absorber A, whence the liquefied portions drop down into the receiver 38 and uncondensed gases rise through the absorber tubes 35 in contact with descending lean absorption liquid supplied by the manifold 40. The evaporator R may be restored to its capacity as a refrigerator by returning the valves 102 and 108 to the positions shown in Fig. 1, thereby connecting the condenser C in the circuit again so that the ammonia or other refrigerant gas is liquefied therein and supplied, together with hydrogen or helium as a carrier gas, into the uppermost coil 90, the by-pass conduit 100 being cut out of circuit by the valve 102, as shown.

In addition to statements of operation of various portions of the system as given in connection with the foregoing description of the apparatus, the following description of the operation of the system as a whole is furnished.

Rich absorption liquid produced in the absorber tubes 35 of the absorber A collects in the receiver 38 and passes thence through the heat exchanging line 60 in the heat exchanger 32, whereby the rich absorption liquid is warmed by indirect heat exchange with the hot lean absorption liquid passing from the lower part of the accumulator K through the heat exchanger 32 to the outlet conduit 33. This heat exchange is facilitated by the turbulence produced by the helical fin 61 secured on the line 60 by metal bonding. The warm rich absorption liquid flowing through the line 60 enters the lower portion of the standpipe 64, where it is picked up by hot gases and vapors issuing from the lower end of the vapor pipe 65 leading from the top of the accumulator K and elevated by the gas lift effect of the hot gases into the upper portion of the standpipe 64, whereby to establish an elevated liquid head such as represented by the liquid level 68 in the collector L. Under conditions of light load when the gas lift effect is relatively light, the liquid raised by gas lift will flow out through the perforations 69 in the top of the standpipe 64 to occupy the surrounding annular chamber 66, but under conditions of heavy load, when larger proportions of hot gases and vapors are being generated, the gas lift effect will be greater and the perforations 69 may not be able to accommodate the elevated liquid, with the result that the excess will flow over the top of the standpipe 64, tending to establish a higher liquid level and consequent hydrostatic head. One of the results of the overflowing of the top of the standpipe 64 and the establishment of a higher liquid level in the collector L under the described conditions of heavy heat load is the transfer of a greater proportion of the rich absorption liquid from the receiver 38 into the upper portion of the collector L, where it is directly available to feed greater quantities of rich absorption liquid to the engine block 10 by way of the feed connection 26.

The rich absorption liquid flowing by gravity from the collector L through the connection 26 enters the vertical passages 20 constituting the liquid cooling jacket in the engine block 10 and absorbs the heat through the walls of the engine cylinders 21, with the result that ammonia gas (or other refrigerant gas) is liberated by the heat generated in the engine block 10, thereby effecting cooling of the engine. The resultant liberated ammonia gases and hot liquid rise into the liquid chamber 25 in the cylinder head 23 and thence pass upward by the gas lift effect of the liberated gas through the neck 28, whence they discharge into the top of the accumulator K. The liberated refrigerant gases and some water vapor separate from the lean absorption liquid which falls into the chamber 29 to establish the liquid level 30, which has a position in the accumulator K still higher than the liquid level 68 in the collector L, which is in turn higher than the liquid level 45 in the receiver 38 of the absorber A.

The hot gases and uncondensed water vapor in the top of the accumulator K pass by way of the vapor conducting pipe 65 down into the standpipe 64 to perform the above-described gas lift effect for elevating the rich absorption liquid into the collector L. During the gas lift operation, contact of the hot gases and vapors from the pipe 65 with the relatively cool, rich absorption liquid in the standpipe 64 causes condensation of most of the water vapors, but at the same time from the incoming rich absorption liquid. The combined refrigerant gases and remaining water vapor accumulate in the top of the collector L and rise from the top thereof through the gas and vapor line 70, whence they continue through the passage 103 in the rotary valve 102 into the gas and vapor line 71 which feeds the coils 75 of the condenser C. Any water vapor remaining in the hot refrigerant gas is condensed in the line 71, such condensation being aided by the fins 72, and flows by gravity back to the line 70 and collector L due to the inclination of the line 71. The water-free refrigerant gases pass through the coils 75 of the condenser C and are thereby liquefied, the condensed refrigerant then flowing from the lowermost coil 75 into the refrigerant storage vessel 85 and thence by way of the conduit 86 to the top coil 90 of the evaporator R, where it meets the stream of carrier gas, such as hydrogen or helium, being discharged across the liquefied refrigerant by the hydrogen line 94 leading from the storage vessel 95 connected with the header 34 at the top of the absorber A.

As the liquefied refrigerant and carrier gas flow through the coils 90, the liquefied refrigerant evaporates due to the partial pressure effect and produces refrigeration in the coils 90, thereby cooling the compartment in which they are located. The resultant cold refrigerant gas and carrier gas flow through the line 96 to the gas receiving chamber 36 in the absorber A and thence pass upward through the absorber coils 35 in countercurrent contact with descending lean absorption liquid which is jetted into the upper ends of the coils 35 by the nozzles 41 carried by the manifold 40.

The lean absorption liquid is supplied to the manifold 40 and nozzles 41 by gravity due to the liquid head established at the level 30 in the accumulator K. This liquid level 30 is sufficiently higher than the manifold 40 that the resultant hydrostatic head overcomes the back pressure produced by the nozzles 41 to insure jetting of the lean absorption liquid uniformly into the upper ends of the coils 35. While the lean absorption liquid received in the accumulator K is hot at the time of delivery from the engine block 10, it is nevertheless cooled in the heat exchanger 32 by indirect contact with the cool rich absorption liquid passing to the standpipe 64 and the engine block 10, the cooled lean absorption liquid flowing to the absorber A through the conduit 33.

From the foregoing, it is apparent that an automobile engine or other engine which generates heat may be cooled, and that a driver's compartment may be cooled or heated, by the employment of a series of heat exchange steps in a sealed system having a series of heat exchange devices, typified by the coils 90 of the evaporator R, the coils 75 of the condenser C, the coils 35 of the absorber A, the heat exchanger 32, the passages 20 in the engine block 10, and the direct heat exchange between rich absorption liquid in the standpipe 64 and hot gases entering from the vapor pipe 65.

As has been described, the air cooling of the coils 75 in the condenser C and of the absorber coils 35 in the absorber A may be regulated as by means of the louvers 50, and these louvers 50 may be adjusted either by the thermostat 44, or manually, as preferred. Again, the control device 44 may be a pressurestat operated by varying pressures in the system, so that, as pressures increase with temperature rises, the louvers will be opened. It is apparent that the temperature of a condensate will rise as pressure in the system rises. However, since the temperatures within the whole system are largely self-controlled by vaporization, condensation, and absorption of refrigerant gas, it is not necessary to employ the louvers 50 except when closer control is desired.

When liquefied refrigerant is produced in the condenser C in quantity in excess of requirements of the evaporator R, such excess quantity will accumulate in the refrigerant storage vessel 85, and if it builds up substantially it will overflow through the line 89 and pass directly into the rich absorption liquid, as by flowing into the rich absorption liquid line 60 as shown.

This situation may arise under heavy heat load conditions where unusually large proportions of rich absorption liquid are shifted from the receiver 38 in the absorber A to raise the liquid head in the chamber 66 in the upper portion of the collector L. As has been described, this shift takes place when high heat load causes vaporization of increased amounts of refrigerant gas which separate in the accumulator K and pass through the pipe 65 to produce more active gas lift and elevate increased amounts of rich liquid into the chamber 66.

The greater volumes of refrigerant gas generated are required to be condensed in the condenser C with a resultant yield of liquefied refrigerant greater than the normal requirements of the evaporator R. Since the thermostatically controlled valve 87 passes only enough liquefied refrigerant to effect desired cooling by the evaporator R, the remainder of the liquid refrigerant accumulates as an excess in the vessel 85, which excess is returned by overflow to the rich absorption liquid, as above stated. Since the refrigerant content of the rich absorption liquid is thereby increased, a correspondingly greater cooling effect is produced in the engine block 10 by a given volume of absorption liquid, due to greater heat absorption upon vaporization. Also, a correspondingly greater gas lift effect is produced in the standpipe 64 and collector L by the greater volume of gases generated. The result of this phase of the operation is the by-passing and recycling of substantial proportions of ammonia for engine cooling and gas lift alone without performing any refrigerating effect in the evaporator R.

From the foregoing, it will be seen that circulation of the absorption liquid and vaporization of the refrigerant therefrom are at a rate proportionate in general to the heat generated by the engine, the system responding to increased heat generation by increased vaporization of refrigerant and increased circulation. Therefore, as heat generation increases, pressure in the system increases by reason of the greater vaporization, and at the same time the temperature of condensation of the refrigerant rises somewhat and the amount of absorption of refrigerant in the liquid increases somewhat for a given temperature. However, this rise of a few degrees in temperature is not of sufficient magnitude to be objectionable.

As previously indicated, a wider range of operating temperatures in the engine block 10 may be cared for by employing another refrigerant having a boiling point intermediate that of water and the refrigerant gas. Thus, an appreciable proportion of the water, for example, 10% to 30%, may be replaced by methyl alcohol or acetone. Therefore, when evaporation of the ammonia from the water does not satisfactorily care for the cooling of the engine, the more elevated temperatures encountered will cause the methyl alcohol or the acetone to be evaporated at least in part, whereby to effect further cooling. Evaporative efficiency of the gas absorption liquid may be improved by including a solute suitable to reduce vapor pressure and lower the partial pressure. The solute may be a liquid, such as glycerol, or a monohydric alcohol like methanol, or it may be a water-soluble salt, such as calcium chloride. When using a substance such as methyl alcohol, both the functions are performed of reducing vapor pressure and supplying another evaporative refrigerant of intermediate boiling point.

As has also been previously indicated, the employment of hydrogen as a carrier gas in iron and steel parts is ordinarily objectionable because of the hydrogen loss by seepage through the pores of the metal. Since it is desirable to employ iron or steel in connection with at least some of the parts of the system, it is desired to employ a satisfactory substitute for hydrogen, helium being preferred. Due to its larger molecule, the helium loss is much less than that of hydrogen, and since its molecular weight is only about one-fourth that of ammonia, it is light enough to separate readily when ammonia is used as the refrigerant gas.

Since many improvements of the generic invention here disclosed will be apparent to those skilled in the art, it is intended to reserve all such variations as fall within the scope of the appended claims.

I claim as my invention:

1. In an engine cooling structure, the combination of: an internal combustion engine having cylinders and a liquid passage in heat transfer relation with the cylinders; and a gas absorption system connected to said passage in sealed relation, said system and said passage containing a circulatory gas absorption liquid and gas, said passage and said engine operating as a generator for said system to liberate gas and circulate said liquid from said passage to said system and back to said passage in response to heat developed by operation of the engine, said system comprising means to condense the liberated gas, means to cool the liquid from which gas has been liberated, and means to feed condensed gas directly into the cooled liquid.

2. In combination: a heat generating power plant having a passage for circulation of a gas absorption liquid therethrough to cool said plant; and a gas absorption cooling system connected with said passage in sealed relation to receive gas absorption liquid from said passage and return gas absorption liquid to said passage, heat generated by said power plant operating to distill refrigerant gas from said gas absorption liquid, said gas absorption cooling system including a condenser adapted to receive liberated refrigerant gas and liquefy the same, a cooler to receive lean absorption liquid, means to conduct liquefied refrigerant directly into the cooled absorption liquid for reabsorption of the refrigerant in the liquid, and means to return resultant rich absorption liquid to said passage in said power plant.

3. In combination: a heat generating power plant which develops fluctuating heat loads between low heat loads requiring minimum cooling and heavy heat loads requiring cooling in excess of normal; a cooling jacket for said power plant adapted to receive gas absorption liquid containing absorbed refrigerant gas; an accumulator connected with said jacket and adapted to receive fluctuating quantities of hot liquid and liberated refrigerant gas from said jacket at an elevated level to establish an elevated lean liquid head; an absorber adapted to receive lean liquid from said accumulator by gravity flow; means to conduct lean liquid from said accumulator to said absorber; a condenser adapted to receive refrigerant gas from said accumulator and condense the same; an evaporator connected with said condenser and adapted to receive condensed refrigerant from said condenser; means to return refrigerant gas from said evaporator to said absorber in contact with lean absorption liquid for reabsorption of the refrigerant gas thereby; and collector means connected to said absorber and providing a storage zone for a variable head of absorption liquid varying as said heat load varies to store and to feed enriched absorption liquid to said cooling jacket.

4. A combination according to claim 3 wherein said collector means providing for said variable head includes: a gas lift chamber connected to receive rich absorption liquid from said absorber; a gas line leading from the top of said accumulator into the bottom of said gas lift chamber whereby rich absorption liquid is elevated in said gas lift chamber by hot gases from said accumulator; a collector arranged to receive the rich absorption liquid elevated in said gas lift chamber to establish a hydraulic head in said collector; and means to conduct absorption liquid from said collector to said cooling jacket.

5. In combination in a sealed system: a heat generating power plant having a passage adapted to receive a circulating gas absorption cooling liquid to cool said plant; a compartment to be cooled; a gas absorption system connected with said passage, said system and said passage containing a circulatory gas absorption cooling liquid containing refrigerant gas which is expelled in said passage by heat generated in said power plant, said gas absorption system including a condenser adapted to receive liberated gas and liquefy the same, an evaporator located in said compartment and adapted to receive liquefied refrigerant, and an absorber connected with said evaporator and with said passage and adapted to receive refrigerant gas from said evaporator and absorption liquid from said passage for reabsorption of the refrigerant gas in said liquid; means to direct cooling air currents over said condenser and over said absorber; and adjustable means to regulate passage of said cooling air currents.

6. In combination: a heat generating power plant having cooling means adapted to receive a gas absorption cooling liquid to cool the power plant by vaporization of an absorbable refrigerant in said liquid; a heat exchange device to receive refrigerant expelled from said liquid; a condenser to receive and condense refrigerant gas expelled from said liquid; absorption means connected with said heat exchange device to receive refrigerant gas from said heat exchange device; means to conduct absorption liquid from said cooling means to said absorption means for absorption of refrigerant gas in the liquid to enrich said liquid; selectively operable valve means to pass condensed refrigerant from said condenser selectively to said rich liquid and said heat exchange device; and means to return rich absorption liquid to said cooling means, said cooling means, said heat exchange means, and said absorption means being connected together in sealed relation to retain all the constituents of the gas absorption liquid.

7. In combination in a sealed system containing a circulatory cooling absorption liquid containing absorbed refrigerant gas: a power plant having heat generating means and a passage in heat transfer relation with said heat generating means for receiving absorption liquid; a connection to supply liquid to said pasage; an accumulator connected with said passage to receive hot absorption liquid therefrom at an elevated level; means to receive and cool absorption liquid from said accumulator; a receiver for cooled absorption liquid; a gas lift device connected to receive cooled absorption liquid from said receiver; means connected to receive liberated hot refrigerant gases from said passage and conduct them to said gas lift device to elevate absorption liqu'd therein; a collector to receive elevated liquid from the gas lift device; means to conduct the elevated liquid from the collector to the connection supplying said passage; means connected to receive and condense refrigerant gas generated by said power plant; and means to return condensed refrigerant directly to said cooled absorption liquid.

8. In combination in a sealed system: an internal combustion engine to be cooled; a compartment to be cooled; an evaporator in said compartment; a cooling jacket connected with said internal combustion engine and having passages to receive absorption liquid containing absorbed refrigerant gas which is liberated by the heat of said engine; means to receive hot liquid and gases from said jacket passages; means connected to receive said gases and condense them to liquefied form; valve controlled means adapted to supply a portion of said liquefied gases to said evaporator; an absorber adapted to receive absorption liquid from said jacket passages and to receive refrigerant gases from said evaporator for reabsorption of refrigerant gases in said liquid; and means connected with said condensing means adapted to conduct excess liquefied refrigerant gases directly to absorption liquid conducted to said absorber.

9. A combination as in claim 8 including additional valve controlled means for diverting said hot gases from said condensing means to said evaporator.

10. A combination according to claim 8 including thermostatically controlled valve means in said means for conducting liquefied refrigerant to said evaporator.

11. A method for cooling a heat generating engine having a passage therein adapted to receive a cooling liquid, said engine developing fluctuating heat loads between low heat loads requiring minimum cooling and heavy heat loads requiring cooling in excess of normal, comprising: circulating during engine operation a rich gas absorption liquid containing absorbed refrigerant gas through said passage and through a gas absorption system connected in sealed relation with said passage, said gas being liberated by engine heat as the liquid moves through said passage; separating liberated gas from the heated liquid and thereby yielding lean absorption liquid; cooling said gas and said lean absorption liquid; reabsorbing the cooled refrigerant gas in the liquid to yield rich absorption liquid and establish a storage body thereof; transferring a substantial proportion of said storage body to an elevated position higher than normal in response to increased heat load in the engine and thereby establishing a relatively high hydrostatic head; and feeding said liquid under said high hydrostatic head to said passage.

12. A method for cooling a heat generating device having a cooling liquid passage, comprising: circulating through said passage a cooling liquid containing absorbed refrigerant gas which is liberated by heat generated by the device; separating liberated hot refrigerant gas from the hot liquid; condensing said refrigerant gas; cooling the separated liquid; commingling the condensed refrigerant with the cooled liquid; and returning the resultant rich liquid to said passage.

13. A method of operating a cooling system having a variably heated liquid receiving passage and a gas absorption system having liquid passages connected in sealed relation with said heated liquid receiving passage, said heated liquid receiving passage developing fluctuating heat loads between low heat loads requiring minimum cooling and heavy heat loads requiring cooling in excess of normal, comprising: variably circulating a rich gas absorption liquid containing absorbed refrigerant gas through said passages as the heat load of said heated liquid varies, said refrigerant gas being liberated by heat applied to said heated passage; separating liberated gas from heated liquid to yield lean absorption liquid; cooling said separated refrigerant gas and said lean liquid; reabsorbing cooled refrigerant gas in the lean liquid to yield rich absorption liquid; establishing a storage body of rich absorption liquid under conditions of light heat load; transferring a substantial proportion of said storage body of liquid to an elevated position higher than normal under influence of heavy heat load to establish a high hydrostatic head; and supplying said elevated liquid under said high hydrostatic head to said heated passage.

14. A method as in claim 13 wherein said refrigerant gas is condensed and condensed gas is introduced directly into the absorption liquid.

15. A method according to claim 13, wherein liberated gas separated from the lean liquid is employed to raise rich liquid by gas lift to said elevated position.

16. In combination: a heat generating power plant having a passage for circulation of a gas absorption liquid therethrough to cool said plant; a gas absorption cooling system connected with said passage in sealed relation to receive gas absorption liquid from said passage and return gas absorption liquid to said passage, heat generated by said power plant operating to distill refrigerant gas from said gas absorption liquid, said gas absorption cooling system including a condenser adapted to receive liberated refrigerant gas and liquefy the same, a cooler to receive lean absorption liquid, an evaporator to receive liquefied refrigerant from said condenser, means adapted to commingle vaporized refrigerant with the lean absorption liquid for reabsorption of the refrigerant in the liquid, and means to return resultant rich absorption liquid to said passage in said power plant; means to pass cooling air currents across said condenser and cooler; and adjustable means to regulate said air currents.

17. The combination of: an internal combustion engine to be cooled having a cooling jacket for a circulating refrigerant gas absorption liquid to remove substantially all excess heat generated by the engine, said engine developing fluctuating heat loads between low heat loads requiring minimum cooling and heavy heat loads requiring cooling in excess of normal and beyond the normal capacity of the gas absorption liquid; and a gas absorption system including said jacket, an accumulator connected to said jacket to receive fluctuating quantities of hot liquid and liberated refrigerant gas from said jacket, a condenser connected to said accumulator to cool and liquefy said refrigerant gas, means to remove said hot liquid from the accumulator and cool it, means to return said refrigerant gas to the cooled liquid to enrich the latter, collector means connected to said cooling means and providing a storage zone to receive variable heads of enriched liquid as said heat loads vary and to establish a high hydrostatic head thereof upon increased heat load, and means connecting said collector means to said jacket.

18. The combination of: an internal combustion engine to be cooled having a cooling jacket for a circulating refrigerant gas absorption liquid to remove substantially all excess heat generated by the engine, said engine developing fluctuating heat loads between low heat loads requiring minimum cooling and heavy heat loads requiring cooling in excess of normal; and a gas absorption system including said jacket, an accumulator connected to said jacket to receive fluctuating quantities of hot liquid and liberated refrigerant gas from said jacket, a condenser connected to said accumulator to cool and liquefy said refrigerant gas, means to remove said hot liquid from the accumulator and cool it, means to return said refrigerant gas to the cooled liquid to enrich the latter, collector means connected to said cooling means to receive enriched liquid, and means connecting said collector means to said jacket.

19. A method for cooling a heat generating power plant of variable heat loads and having a cooling passage, comprising: circulating through a circuit including said passage a solution containing a high-boiling liquid, a low-boiling refrigerant constituent absorbed in said liquid, and a refrigerant constituent of intermediate boiling point; under normal or low heat load conditions evaporating said low-boiling constituent from said solution, conducting the vapors of said low-boiling constituent in a stream through a first branch of said circuit which includes said passage, condensing the vapors of said stream in said first branch, conducting the residue of said solution in a stream through a second branch of said circuit, joining said streams, and conducting the resultant composite stream to said passage; and under high heat load conditions evaporating from said solution both refrigerant constituents and conducting the same in a stream through said first branch of said circuit, condensing the vapors of the last mentioned stream in said first branch, conducting the residue of said solution from evaporation of both refrigerant constituents in a stream through said second branch, joining the last mentioned residue stream and the last mentioned condensed vapor stream, and conducting such composite stream to said passage.

20. A method for cooling a heat generating power plant of variable heat loads and having a cooling passage, comprising: circulating through a circuit including said passage a solution containing a high-boiling liquid, a low-boiling refrigerant constituent absorbed in said liquid, and a refrigerant constituent of intermediate boiling point; under normal or low heat load utilizing the heat absorbed in said passage for driving off a vapor stream consisting predominately of said low-boiling constituent from said solution, conducting the stream of vapors of said low-boiling constituent through a first branch of said circuit which includes said passage, condensing the vapors of said stream in said first branch, conducting the residue of said solution in a stream through a second branch of said circuit, joining said streams, and conducting the resultant composite stream to said passage; and under high heat load utilizing the heat absorbed in said passage for driving from said solution a vapor stream consisting predominately of both refrigerant constituents and conducting the same in a stream through said first branch of said circuit, condensing the vapors of the last mentioned stream in said first branch, conducting the residue of said solution from evaporation of both refrigerant constituents in a stream through said second branch, joining the last mentioned residue stream and the last mentioned condensed vapor stream, and conducting such composite stream to said passage.

MARION F. KNOY.

REFERENCES CITED

The following references are of record in the file of this patent:

UNITED STATES PATENTS

| Number | Name | Date |
| --- | --- | --- |
| 1,897,223 | Altenkirch | Feb. 14, 1933 |
| 1,955,345 | Sarnmark | Apr. 17, 1934 |
| 1,960,821 | Maiuri et al. | May 29, 1934 |
| 2,009,067 | Mulholland | July 23, 1935 |
| 2,080,195 | Bergholm | May 11, 1937 |
| 2,134,188 | Haywood | Oct. 25, 1938 |

FOREIGN PATENTS

| Number | Country | Date |
| --- | --- | --- |
| 676,408 | France | Feb. 22, 1930 |
| 693,689 | France | Sept. 1, 1930 |

Certificate of Correction

Patent No. 2,481,520                                                    September 13, 1949

MARION F. KNOY

It is hereby certified that errors appear in the printed specification of the above numbered patent requiring correction as follows:

Column 5, line 22, for "evporator" read *evaporator*; column 10, line 43, after the word "time" insert *liberates additional quantities of refrigerant gas*; column 11, line 63, for "describer" read *described*;

and that the said Letters Patent should be read with these corrections therein that the same may conform to the record of the case in the Patent Office.

Signed and sealed this 24th day of January, A. D. 1950.

[SEAL]

THOMAS F. MURPHY,
*Assistant Commissioner of Patents.*